(12) United States Patent
Soverns et al.

(10) Patent No.: US 10,903,761 B2
(45) Date of Patent: Jan. 26, 2021

(54) MICROGRID CONTROLLER WITH ONE OR MORE SOURCES

(71) Applicant: GO ELECTRIC, INC., Anderson, IN (US)

(72) Inventors: Robert Anthony Soverns, Pendleton, IN (US); Alex Spencer Creviston, Muncie, IN (US)

(73) Assignee: GO ELECTRIC INC.

( * ) Notice: Subject to any disclaimer, the term of this patent is extended or adjusted under 35 U.S.C. 154(b) by 0 days.

(21) Appl. No.: 16/444,022

(22) Filed: Jun. 18, 2019

(65) Prior Publication Data

US 2019/0386581 A1 Dec. 19, 2019

Related U.S. Application Data

(60) Provisional application No. 62/686,305, filed on Jun. 18, 2018.

(51) Int. Cl.
*H02M 7/797* (2006.01)
*G06F 1/3206* (2019.01)

(52) U.S. Cl.
CPC .......... *H02M 7/797* (2013.01); *G06F 1/3206* (2013.01)

(58) Field of Classification Search
None
See application file for complete search history.

(56) References Cited

U.S. PATENT DOCUMENTS

| | | | | |
|---|---|---|---|---|
| 4,618,779 A | * | 10/1986 | Wiscombe | G05F 1/59 307/60 |
| 5,266,838 A | * | 11/1993 | Gerner | G05F 1/577 307/19 |
| 2010/0318234 A1 | | 12/2010 | Moore et al. | |
| 2011/0106322 A1 | * | 5/2011 | Ou | H02J 3/381 700/286 |
| 2011/0248569 A1 | * | 10/2011 | Son | H02J 3/381 307/87 |
| 2013/0190938 A1 | * | 7/2013 | Zadeh | H02J 13/0013 700/291 |
| 2014/0005846 A1 | * | 1/2014 | Boo | H02J 3/381 700/291 |
| 2014/0183949 A1 | | 7/2014 | Murano | |
| 2015/0180260 A1 | * | 6/2015 | Juan | H02J 7/0063 320/126 |
| 2015/0180342 A1 | * | 6/2015 | Yang | H02M 3/1584 323/268 |
| 2017/0264122 A1 | | 9/2017 | Greening et al. | |
| 2017/0331325 A1 | * | 11/2017 | Ristau | G05B 15/02 |
| 2017/0346283 A1 | * | 11/2017 | Inam | H02J 7/35 |
| 2018/0191160 A1 | * | 7/2018 | Carr | H02J 3/14 |

FOREIGN PATENT DOCUMENTS

WO 2016176628 A1 11/2016

OTHER PUBLICATIONS

International Search Report and Written Opinion for corresponding PCT/US2019/037619, dated Aug. 28, 2019.

* cited by examiner

*Primary Examiner* — Bentsu Ro
(74) *Attorney, Agent, or Firm* — Barnes & Thornburg LLP

(57) ABSTRACT

A microgrid control system that can govern power provided to a load from various power sources. The microgrid control system can determine apportionment of power between the various sources based on characteristic power features of the various sources.

30 Claims, 5 Drawing Sheets

MICROGRID CONTROLLER WITH ONE OR MORE SOURCES

CROSS-REFERENCE TO RELATED APPLICATIONS

This non-provisional application claims the benefit of priority for U.S. Provisional Application No. 62/686,305, filed on Jun. 18, 2018, the contents of which are hereby incorporated by reference, in their entirety, including but without limitation those portions related to microgrid control.

FIELD OF THE DISCLOSURE

The present disclosure is directed to the field of a microgrid with at least one energy source. The microgrid combines DC level matching from various sources as well as DC link voltage control.

BACKGROUND

Batteries and photovoltaic systems store or generate electricity in direct current form. To make this form of electricity more useful and universal it is typically converted to alternating current using an inverter. Inverters use switches to convert DC to AC, generally the AC output voltage is a function of the DC input voltage following a mathematical formula of AC output RMS=DC input/1.414. The output voltage may need to be boosted using an output side AC transformer or by boosting the input DC voltage. According to the present disclosure, a microgrid is configured to receive at least one DC or AC known or unknown voltage source and determine whether the voltage source is providing enough voltage to power a microgrid. If the microgrid receives multiple sources, the microgrid will determine which source(s) to pull power from and pull power from those sources, ignoring the unselected sources.

SUMMARY

According to an aspect of the present disclosure, a method of operation for a microgrid for power by a number of power sources, may include detecting one or more characteristic power features of first and second power sources of the number of power sources, comparing the detected characteristic power features of the first and second power sources, determining an apportionment of power between the first and second power sources for communication to the load, and connecting the number of power sources to provide power for output to the load based on the determined apportionment between the first and second power sources.

In some embodiments, comparing the detected characteristic power features may include comparing voltage available from each of the first and second sources with a voltage requirement of the load. Comparing the detected characteristic power features may include ranking the power sources according to power capacity of each power source. In some embodiments, ranking according to power capacity of each power source includes ranking according to the voltage level available as input to power the load.

According to another aspect of the present disclosure, a microgrid control system for governing power output to a load from a number of power sources may include a control device configured to sense characteristic power features of the number of power sources, to compare characteristic power features of the number of power sources, to determine an apportionment of power between the number of power sources for communication to the load based on the sensed characteristic power features, and to provide instructions to selectively provide power for output to a load based on the determined apportionment, and a DC link bus configured to selective connect one or more of the number of power sources for output to provide power to the load based on the instructions from the control device. In some embodiments, the number of power sources may include at least two power sources, at least one of the at least two power sources comprising a renewable power source.

BRIEF DESCRIPTION OF THE DRAWINGS

A more complete understanding of a the disclosed embodiments and the utility thereof may be acquired by referring to the following description in consideration of the accompanying drawings, in which like reference numbers indicate like features, and wherein.

Figure 1:
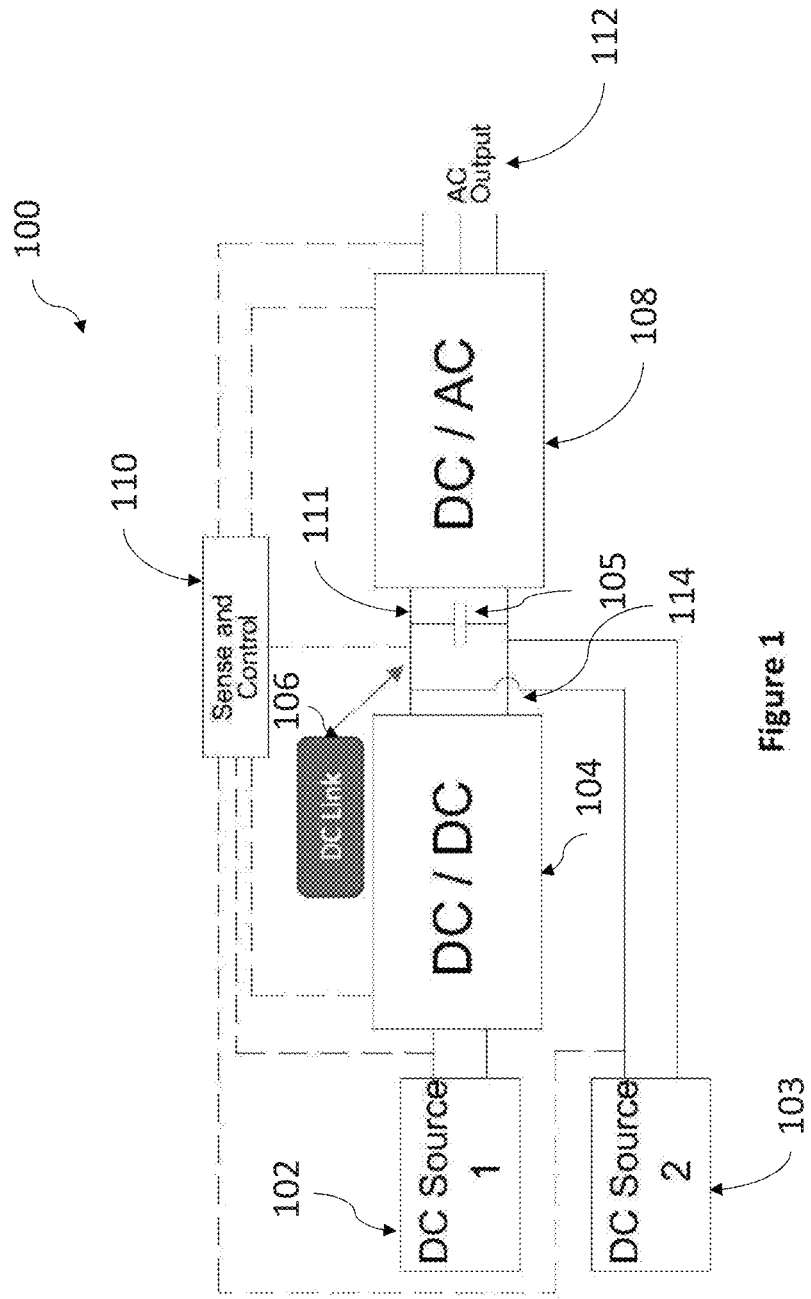
FIG. 1 shows a DC voltage control system wherein a first DC Source is connected to a DC to DC converter and a second DC source is connected to the output of the DC to DC converter and the DC link.

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and further applications of the principles of the disclosure which would normally occur to one skilled in the art to which the disclosure relates. Unless otherwise indicated, the components in the drawings are shown proportional to each other.

DETAILED DESCRIPTION OF THE DRAWINGS

In some instances an electrical grid powering a building, vehicle, or any other load that requires power may encounter interruptions or go out, resulting in the building, vehicle, or any other load to not receive power from the grid. In these instances, a microgrid may act as a back-up and provide power to the grid or load. These microgrids may receive power from a variety of sources, renewable or non-renewable, known or unknown, and convert that power to usable power. Microgrids may be connected to multiple sources and need to determine which source to pull power from. To accomplish this, a microgrid 100 described below includes at least one power source 102, a DC to DC converter 104, a DC Link 106, an inverter 108, and a control system 110.

FIG. 1 shows microgrid 100 including power source 102, power source 103, DC to DC converter 104, capacitor 105, DC link 106, inverter 108, and control system 110. Power source 102 is connected to DC to DC converter 104 and control system 110. DC to DC converter 104 is connected to DC Link 106, control system 110, and power source 103. DC to DC converter 104 may be, but is not limited to, a buck converter, a boost converter, or a buck boost converter. DC Link voltage 106 is connected to control system 110, DC to DC converter 104, and to inverter 108. DC Link voltage 106 is a bus that is configured to connect any number of devices together. Power sources 102, 103 are each DC power sources. Capacitor 105 acts as a filter for an input 111 of inverter 108. Power source 103 is connected to control system 110 and DC link 106. Inverter 108 has an AC output 112 that can attach to a load (not shown) such as a power grid or an electrical device. AC output 112 may be, but is not limited to 208 VAC, 380 VAC, 415 VAC, and 48 VAC at 50 HZ, 60 HZ, or any other frequency.

Power sources 102, 103 can be renewable or non-renewable, and power sources 102, 103 can cooperate with microgrid 100 without a user assigning a type to power sources 102, 103. Renewable energies may include but are not limited to wind energy, solar energy, biofuel, biomass, geothermal, hydropower, tidal energy, and wave energy. Non-renewable energy sources may include, but are not limited to, batteries, coal, petroleum, natural gas, nuclear energy, and fossil fuels. Microgrid 100 may include any number or combination of renewable and non-renewable sources.

Output 114 of DC to DC converter 104 sets a DC link voltage requirement that may be above the voltage requirements of the load and inverter's 108 output 112. Control system 110 is in parallel with power source 103 and DC link 106. Control system 110 reads the voltage of power source 103 and determines if power source 103 can provide power to microgrid 100. If control system 110 determines that power source 103 can provide power and that power is above a minimum voltage required by inverter 108, control system 110 may lower the DC Link voltage to allow current and power to flow from power source 103 to DC Link 106 and inverter 108. Inverter 108 turns the DC wave into an AC wave form that matches the frequency and amplitude requirements of the load. In some instances, power source 103 may provide enough power to DC link 106, but control system 110 may opt not to use power source 103 to power the load. In other instances, power source 103 may not provide enough power. In that case, control system 110 aggregates power from both power sources 102, 103 to power the load. Control system 110 may aggregate or pull from any number of power sources.

Figure 2:
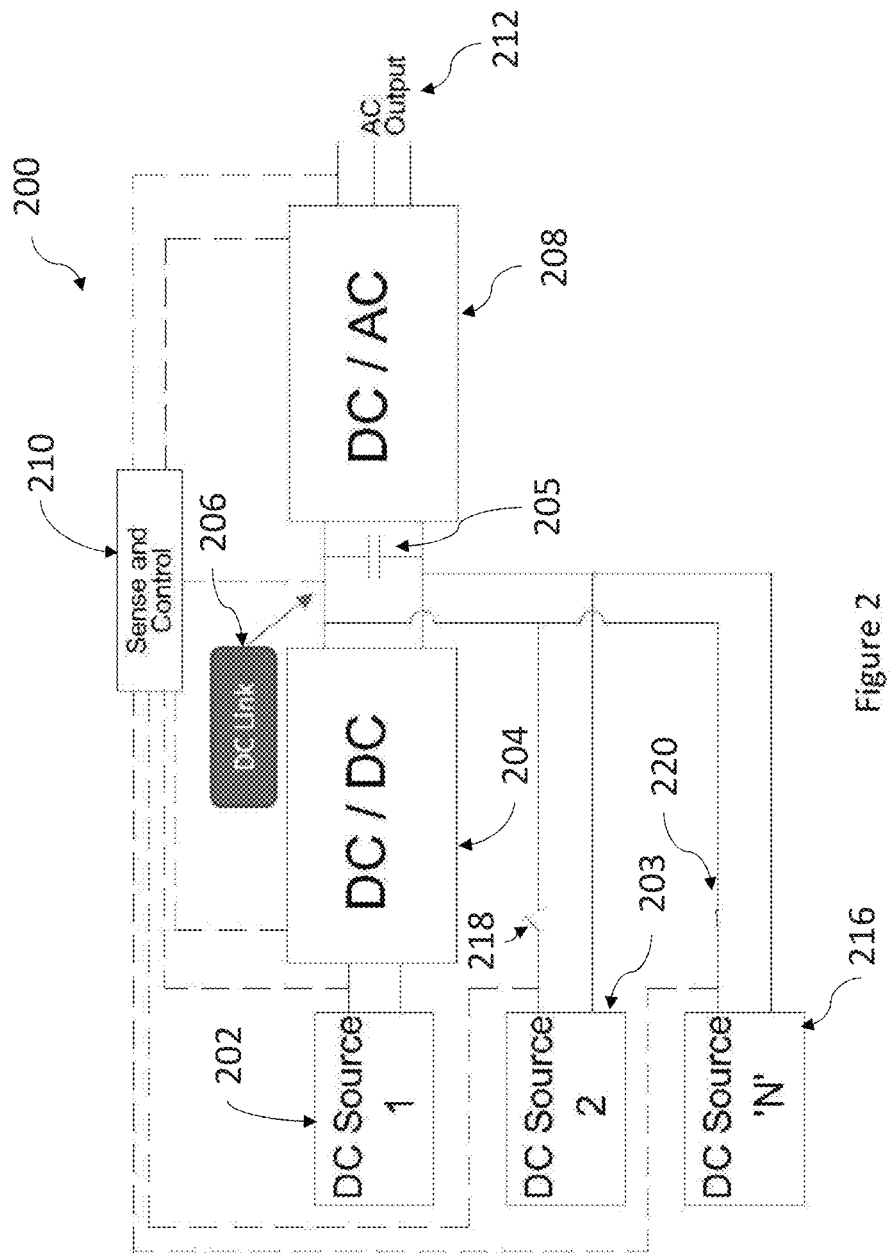
FIG. 2 shows the DC voltage control system of FIG. 1 and further includes "N" voltage sources that are connected to the output of the DC to DC converter and the DC link.

FIG. 2 shows microgrid 200, which operates similarly to microgrid 100 as shown in FIG. 1, but with the addition of a power source 216 that represents any number of power sources and switches 218, 220 that are attached in series with each power source 203, 216. Power source 216 is attached to a DC link 206 in parallel with power source 203, an output of DC to DC converter 204, and a control system 210. Control system 210 reads the characteristics of each power source 203, 216 and determines which power source to pull power from based on the amount of power each source provides, the cost of using each power source 203, 216, the type of power that power sources 203, 216 provide, or by reading and comparing any other characteristics of each power source 203, 216. Once control system 210 picks a power source, control system 210 closes the switch of the chosen power source and opens the switch of the power sources that were not chosen. For example, if power sources 203, 216 are both providing power to microgrid 200 and control system 210 chooses power source 203, control system 210 will close switch 218 and open switch 220, pulling power from power source 203. Control system 210 will then lower the DC link voltage threshold to a voltage that is both sufficient to power the load and low enough for power source 203 to provide power and voltage. An operator may manually input a DC link voltage threshold. In other embodiments, there can be any number power sources and switches connected in parallel with these power sources and control system 210. In each embodiment, control system 210 chooses a power source to power a load at an output 212 through an inverter 208. A capacitor 205 acts as a filter to smooth out the chosen power source's wave form. In other embodiments, control system 210 aggregates multiple power sources to power a load.

An operator may select which power source will provide power to microgrid 200 with a priority switch (not shown), which communicates with control system 210. The operator can program the priority switch to choose a power source on its own by examining each power source's efficiency, noise (power from silent sources), capacity, or availability. The operator may give a weight to each of these factors based on importance to the user at the time. Control system 210 may determine which power source or power sources will power microgrid 200 based on the weights and values of each factor. If the operator has not given a weight to each factor, control system 210 may look solely at each power source's capacity to determine which power source will power microgrid 200. In some embodiments, control system 210 will classify and rank each power source's capacity and then choose which power source will power microgrid 210.

To rank and choose which power source will power microgrid 200, control system 210 first analyzes the input from each power source. Control system 210 then ranks the inputs of each power source's voltage in order from highest to lowest. Control system 210 will then choose the power source with the highest voltage and increases the DC link voltage so microgrid 200 may only pull power from the power source with the highest voltage. If there is a load that requires more power than one source can provide, control system 210 system may utilize multiple power sources to pull enough power to power the load. In doing so, control system 210 lowers the DC link voltage so enough power sources can sufficiently power the load. In other embodiments, an operator may set control system 210 so it looks at other factors to determine which power sources to pull power from to power the load.

Control system 210 continuously monitors microgrid 200 while microgrid 200 is in operation. If a load requires more or less power from microgrid 200, control system 210 can adjust the DC link voltage and each switch 220, 218 so an output 212 will match the load's needs. Similarly, if one of or all of power sources 203, 216 go down or change the amount of power they are providing, control system 210 can adjust switches 220, 218 and the DC link voltage to accommodate the load. For example, if power source 203 provides solar energy to microgrid 200, as the sun comes out and goes in and out of cloud cover during the day, power source 203 will provide varying degrees of power. Control system 210 can account for these changes by opening and closing different switches, raising or lowering DC link voltage, and adjusting inverter 208 to provide predictable and consistent power to a load. In some embodiments, control system 210 can adjust microgrid 200 fast enough so the load will not lose power for a substantial period of time. A substantial period of time in this context is a time period where an ordinary person would not realize the power has gone out and any machines relying on microgrid 200 will not turn off, restart, or run out of power. Switches 220, 218 provide protection against backfeeding one power source with another.

Figure 3:
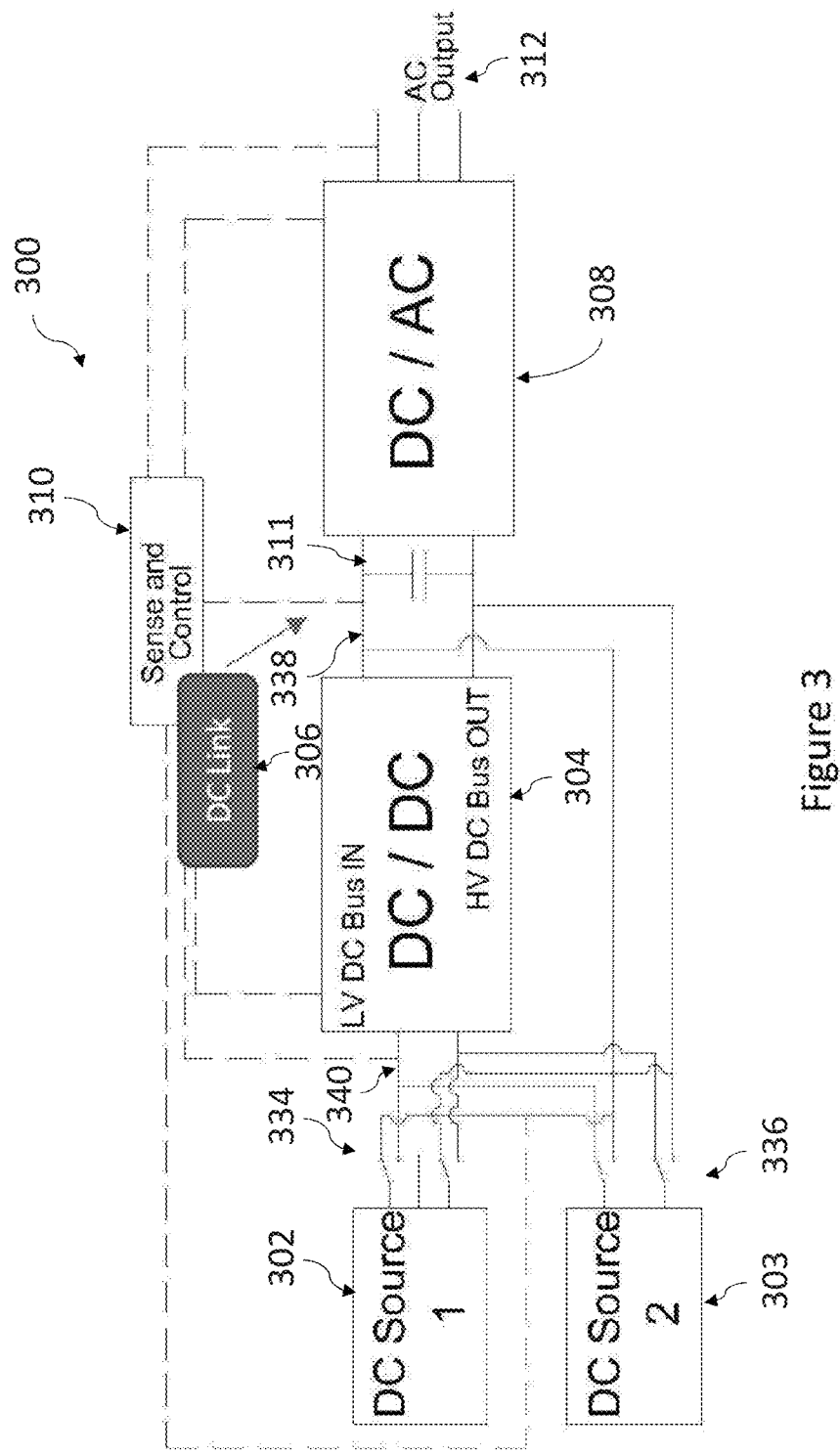
FIG. 3 shows the DC voltage control system of FIG. 1 and further includes a switching network that allows for further control of voltage directed into the DC to DC converter.

FIG. 3 shows a microgrid 300. Microgrid 300 is similar to microgrid 100, but microgrid 300 further includes switch networks 334, 336 on each power source 302, 303. Switch networks 334, 336 route the highest voltage power source to a high voltage output 338 of a DC to DC converter 304 and a DC link 306. High voltage output 338 then acts as an input 311 to inverter 308. Inverter 308 has an output 312 to a load (not shown). FIG. 3 shows power source 303 routed into a low voltage input 340 of DC to DC converter 304 and power source 302 routed to high voltage output 338. Depending on the voltage on each power source, this configuration can reverse. Each power source 303, 304 can be a different type of energy.

Microgrid 300 may ensure that a lower voltage can feed into the system. For example, power source 302 may be a battery and power source 304 may be a photovoltaic energy source. If the power source 302 provides 600 VDC, the DC link voltage is at 700 VDC, and power source 303 provides 300 VDC when power source 303 receives very little sun and then provides 700 VDC when the sun is not out and not blocked, a controller system 310 can control switch networks 334, 336 to power source 303 for as long as possible. First, Controller system 310 would lower the DC link voltage to match the voltage of power source 302. Second, controller system would shift power source 302 to high voltage output 338, and DC to DC converter is used to boost power source 303 to the DC link voltage. If power source 303 increases above the DC link voltage, switch network 336 may be reversed to feed power source 303 into DC link 306. This configuration may reduce conversion losses. Microgrid 300 may include any number of power sources and switch networks attached in series to these power sources. Further, power sources 303, 304 may be AC sources connected with rectifiers to convert the AC power to DC power.

Figure 4:
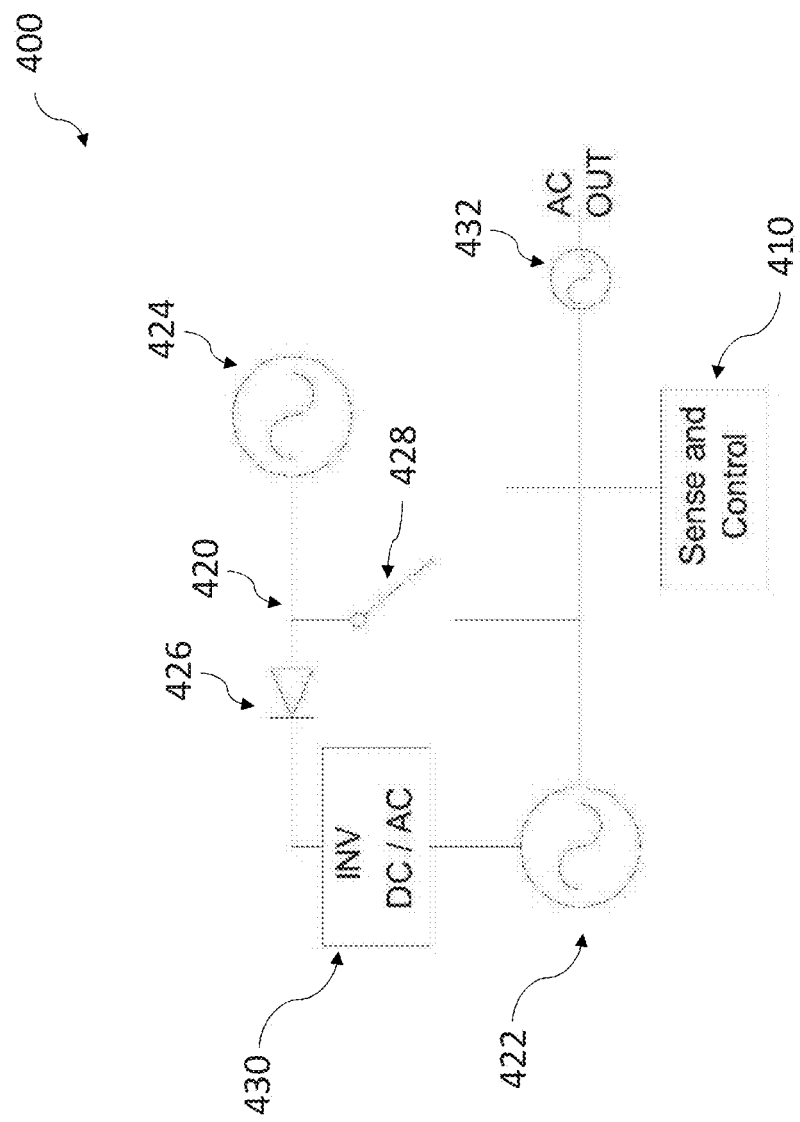
FIG. 4 shows an AC voltage control system wherein the system can adjust the frequency and amplitude based on the requirements the load.

Although each type of renewable energy and non-renewable energy generates a different wave form with varying degrees of noise, frequency, and amplitude, a microgrid 400 may use a system of inverters, rectifiers, and boosters to both smooth out the wave form and adjust the frequency and amplitude so it can meet the load's specification. FIG. 4 shows microgrid 400 using an AC link 420 to control the power that gets to a load. Microgrid 400 includes an AC source 422, an AC source 424, a diode 426, a switch 428, an inverter 430, a control system 410, and an AC output 432. AC source 422 is directly connected to AC output 432. AC source 424 may augment AC source 422 if AC source's 424 amplitude and frequency exactly match AC source's 422 amplitude and frequency and AC source 422 does not provide enough power to AC output 432. Control system 410 determines the amplitude and frequency of AC sources 422, 424. If AC sources 422, 424 have the same frequency and amplitude, and the augmented waveform fulfills necessary AC output 432, control system 410 closes switch 428 and AC source 424 is able to augment, or replace, AC output 432. If control system 410 determines AC sources 422, 424 have different frequencies or do not provide the proper amount of power to AC output 432, control system 410 opens switch 428 and AC source's 422 wave form goes through diode 426 and into inverter 430.

If AC source 424 cannot properly augment AC source 422, for reasons such as, but not limited to, not providing enough voltage, providing too much voltage, or having a different frequency, AC source's 424 wave form is directed through diode 426, which converts the waveform from AC to DC. In other embodiments, diode 426 may be another type of rectifier. If AC source's 424 voltage is higher than the required voltage at AC output 432, inverter 430 may be used to adjust AC source's 424 waveform to the proper amplitude and frequency to aggregate with AC source's 422 wave form and create AC output 432. If AC source 424 is lower than AC output 430, a DC to DC converter (not shown) is included between the rectifier and inverter 430. The DC to DC converter may be used to boost AC source's 424 voltage high enough so inverter 430 can provide a user's desired voltage at AC output 432.

If AC source 424 is nominally the same voltage and frequency as the desired output 432 but is too unstable to be linked to a pre-existing AC waveform at 432. Inverter 430 can be used to load and stabilize AC source 424 by supplying power from AC source 424 thru rectifier 426 to AC output 432. Inverter 430 can also be used to synchronize its output to AC source 424 so that 424 can be directly linked to AC output 432.

Figure 5:
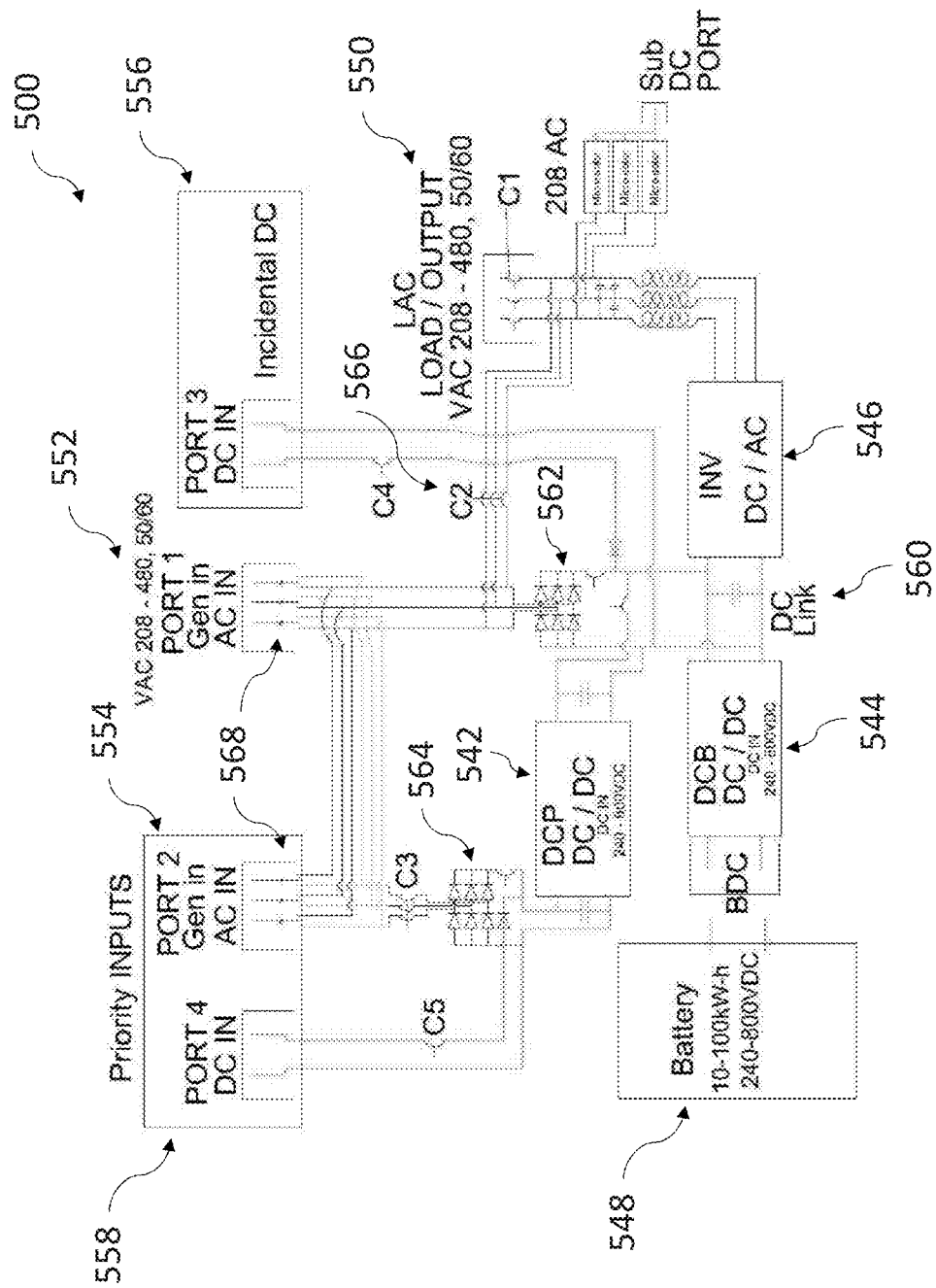
FIG. 5 shows an overview of a microgrid with a sensor control system.

FIG. 5 shows a microgrid 500 with two DC to DC converters 542, 544, an inverter 546, a battery 548, load 550, and ports 552, 554, 556, 558. Power sources feed into ports 552, 554, 556, 558. Also, ports 552, 554, 556, 558 are optional and may be interchangeable. Battery 548 may be any dc energy source or AC source attached in series with a rectifier (not shown). Load 550 may be a critical load, primary source, or a grid bus. Microgrid 500 also includes a DC link 560. DC to DC converter 544 sets the DC link voltage at DC link 560.

In some embodiments, ports 552, 556 act as inputs if ports 552, 556 are compatible with load 550. Ports 552, 556 are compatible with load 550 if they can provide enough voltage to directly feed the DC link 560 to support the load 550. Ports 552, 556 can be in parallel with each other as DC feeds, port 556 is used for DC feeds. If the voltage source feeding into port 552 is an AC source, with a higher rectified amplitude than the output voltage 550 requires, then the source can be rectified thru a rectifier 562 and fed directly to DC link 560. If port 552 is an AC source that exactly matches output 550 in amplitude and frequency then port 552 may be directly linked to support 550 thru contact 566, thus avoiding conversion losses.

Ports 554, 558 may act as inputs whenever they are providing power. Ports 554, 558 feed into DC to DC converter 542. If port 554 is receiving AC power, a rectifier 564 will convert the AC power to DC power before the power reaches DC to DC converter 542. DC to DC converter 542 may convert the voltage from ports 554, 558 to a voltage above the DC link voltage so ports 554, 558 always are pushed to an output 560, load 550, or battery 548.

In some embodiments, ports 552, 554 are attached to a shifting contactor arrangement, 568 which can shift the routing of the power ports 552, 554 provide to DC link 506, DC to DC converter 542, or directly to load 550. Multiple sources may supply power to microgrid 500 by interacting with the shifting contactor.

Ports 552, 554, 556, 558 may be, but are not limited to, lug style copper bars built for repeated connections. Ports 552, 554, 556, 558 may be covered by covers (not shown) when in use. If the covers are 'up', it indicates a connection with a high impedance measurement.

Areas around ports 552, 554, 556, 558 may be reinforced with aluminum washers. Microgrid 500 may have an internal lug connection with a pig tail battery specific connector. Power connections are specified for a power loss of less than 3 Watts at 200 A. Microgrid 500 uses inline reactors and capacitors wound in a whe configuration. The inline reactors may be aluminum wires with ferrite cores, or any other system that can possibly include liquid cooled reactors. Microgrid 500 may further include an LCL filter or step up transformer at output 560.

Within the present disclosure, determined apportionment may include zero apportionment between the first and second power sources. Zero apportionment may include connecting to provide power from only one of the first and second power sources. Connecting to provide power based on the determined apportionment may include connecting to provide power a first value of power from the first power source and/or a second value of power from the second power source, wherein the first and second values of power may be based on the determined apportionment.

Within the present disclosure, each of detecting one or more characteristic power features, comparing the detected characteristic power features, and/or determining an apportionment of power between the first and second power sources, may be performed continuously. Connecting to provide power may include re-connecting to provide power based on the continuously determined apportionment of power between the first and second power sources. Re-connecting to provide power based on the continuously determined apportionment of power between the first and second power sources may include at least one of adjusting switches of at least one of the number of power sources, adjusting a DC link voltage, and adjusting an output of an inverter in communication with the load.

Within the present disclosure, re-connecting may include quickly performing at least one of adjusting switches of at least one of the number of power sources, adjusting a DC link voltage, and adjusting an output of an inverter in communication with the load to block against loss of power for a substantial period of time. Loss of power for a substantial period of time may include loss of power exceeding a predetermined threshold causing connected machines to perform power off, restart, or experience power failure. Connecting to provide power may include adjusting a DC link voltage to match load voltage requirements. Connecting to provide power may include reversing power to feed one of the first and second power sources. Connecting to provide power may include augmenting power from at least one of the first and second power sources. Augmenting power may include at least one of adjusting one or more of amplitude and frequency of power from the at least one of the first and second power sources. Augmenting power may include converting from AC to DC. Augmenting power may include stabilizing power from the at least one of the first and second power sources. Power for output to the load may be AC power.

We claim:

1. A method of operation for a microgrid for power by a number of power sources, the method comprising:
   detecting one or more characteristic power features of first and second power sources of the number of power sources,
   comparing the detected characteristic power features of the first and second power sources,
   determining an apportionment of power between the first and second power sources for communication to the load,
   wherein each of detecting one or more characteristic power features, comparing the detected characteristic power features, and determining an apportionment of power between the first and second power sources, are performed continuously, and
   connecting the number of power sources to provide power for output to the load based on the determined apportionment between the first and second power sources, wherein connecting to provide power includes re-connecting to provide power based on the continuously determined apportionment of power between the first and second power sources, and re-connecting to provide power based on the continuously determined apportionment of power between the first and second power sources includes at least one of adjusting switches of at least one of the first and second power sources, adjusting a DC link voltage, and adjusting an output of an inverter in communication with the load.

2. The method of operation of claim 1, wherein the comparing the detected characteristic power features includes comparing voltage available from each of the first and second power sources with a voltage requirement of the load.

3. The method of operation of claim 1, wherein the comparing the detected characteristic power features includes ranking the power sources according to power capacity of each power source.

4. The method of operation of claim 3, wherein ranking according to power capacity of each power source includes ranking according to the voltage level available as input to power the load.

5. The method of operation of claim 1, wherein the determined apportionment includes zero apportionment between the first and second power sources.

6. The method of operation of claim 5, wherein zero apportionment includes connecting to provide power from only one of the first and second power sources.

7. The method of operation of claim 1, wherein connecting to provide power based on the determined apportionment includes connecting to provide a first value of power from the first power source and a second value of power from the second power source, wherein the first and second values of power are based on the determined apportionment.

8. The method of operation of claim 1, wherein re-connecting includes quickly performing at least one of adjusting switches of at least one of the of first and second power sources, adjusting a DC link voltage, and adjusting an output of an inverter in communication with the load to block against loss of power for a substantial period of time.

9. The method of operation of claim 8, wherein loss of power for a substantial period of time includes loss of power exceeding a predetermined threshold causing connected machines to perform power off, restart, or experience power failure.

10. The method of operation of claim 1, wherein connecting to provide power includes adjusting a DC link voltage to match load voltage requirements.

11. The method of operation of claim 1, wherein connecting to provide power includes reversing power to feed one of the first and second power sources.

12. The method of operation of claim 1, wherein connecting to provide power includes augmenting power from at least one of the first and second power sources.

13. The method of operation of claim 12, wherein augmenting power includes at least one of adjusting one or more of amplitude and frequency of power from the at least one of the first and second power sources.

14. The method of operation of claim 12, wherein augmenting power includes converting from AC to DC.

15. The method of operation of claim 12, wherein augmenting power includes stabilizing power from the at least one of the first and second power sources.

16. The method of operation of claim 12, wherein power for output to the load is AC power.

17. A microgrid control system for governing power output to a load from a number of power sources, comprising:
- a control device configured to continuously sense characteristic power features of the number of power sources, compare characteristic power features of the number of power sources, determine an apportionment of power between the number of power sources for communication to the load based on the sensed characteristic power features, and to provide instructions to selectively provide power for output to a load based on the determined apportionment, and
- a DC link bus configured to selectively connect one or more of the number of power sources for output to provide power to the load based on the instructions from the control device, wherein selectively connecting includes re-connecting to provide power based on the continuously determined apportionment of power by at least one of adjusting switches of one or more of the number of power sources, adjusting a DC link voltage, and adjusting an output of an inverter in communication with the load.

18. The microgrid control system of claim 17, wherein the number of power sources includes at least two power sources, at least one of the at least two power sources comprising a renewable power source.

19. The microgrid control system of claim 17, wherein configuration to compare characteristic power features of the number of power sources includes configuration to compare voltage available from each of the number of power sources with a voltage requirement of the load.

20. The microgrid control system of claim 17, wherein configuration to compare characteristic power features of the number of power sources includes ranking the number of power sources according to power capacity of each power source.

21. The microgrid control system of claim 20, wherein ranking according to power capacity of each power source includes ranking according to the voltage level available as input to power the load.

22. The microgrid control system of claim 17, wherein the determined apportionment includes zero apportionment between the number of power sources.

23. The microgrid control system of claim 17, wherein configuration to selectively connect includes connecting to provide a first value of power from at least one of the number of power sources and a second value of power from at least another of the number of power sources, wherein the first and second values of power are based on the determined apportionment.

24. The microgrid control system of claim 17, wherein re-connecting includes quickly performing at least one of adjusting switches of at least one of the number of power sources, adjusting a DC link voltage, and adjusting an output of an inverter in communication with the load to block against loss of power for a substantial period of time.

25. The microgrid control system of claim 24, wherein loss of power for a substantial period of time includes loss of power exceeding a predetermined threshold causing connected machines to perform power off, restart, or experience power failure.

26. The microgrid control system of claim 17, wherein configuration to selectively connect to provide power includes reversing power to feed at least one of the number of power sources.

27. The microgrid control system of claim 17, wherein configuration to connect to provide power includes augmenting power from at least one of the number of power sources.

28. The microgrid control system of claim 27, wherein augmenting power includes at least one of adjusting one or more of amplitude and frequency of power from the at least one of the number of power sources.

29. The microgrid control system of claim 27, wherein augmenting power includes converting between AC and DC.

30. The microgrid control system of claim 27, wherein augmenting power includes stabilizing power from the at least one of the number of power sources.

* * * * *